(12) United States Patent
Mailaender et al.

(10) Patent No.: US 6,989,902 B2
(45) Date of Patent: Jan. 24, 2006

(54) TESTING ARRANGEMENT FOR OPTICAL DEVICES

(75) Inventors: Siegfried Mailaender, Pfrondorf (DE); Malte Schlueter, Leinfelden (DE)

(73) Assignee: Agilent Technologies, Inc., Palo Alto, CA (US)

( * ) Notice: Subject to any disclaimer, the term of this patent is extended or adjusted under 35 U.S.C. 154(b) by 102 days.

(21) Appl. No.: 10/071,992

(22) Filed: Feb. 8, 2002

(65) Prior Publication Data

US 2003/0011778 A1  Jan. 16, 2003

(30) Foreign Application Priority Data

Jul. 13, 2001 (EP) .................................. 01117060

(51) Int. Cl.
*G01B 9/02* (2006.01)
(52) U.S. Cl. ...................................... 356/477; 356/450
(58) Field of Classification Search ................ 356/450, 356/477, 470

See application file for complete search history.

(56) References Cited

U.S. PATENT DOCUMENTS

| | | | | |
|---|---|---|---|---|
| 3,690,159 A | * | 9/1972 | Kersch et al. ................. | 73/800 |
| 4,139,302 A | * | 2/1979 | Hung et al. .................... | 356/32 |
| 4,921,348 A | * | 5/1990 | Yeung et al. ................. | 356/128 |
| 5,268,741 A | * | 12/1993 | Chou et al. ................... | 356/479 |
| 5,285,995 A | * | 2/1994 | Gonzalez et al. ........... | 248/550 |
| 5,459,570 A | * | 10/1995 | Swanson et al. ............. | 356/479 |
| 5,675,412 A | * | 10/1997 | Solomon ...................... | 356/450 |
| 6,490,045 B1 | * | 12/2002 | Dakin et al. ................. | 356/483 |
| 6,797,927 B2 | * | 9/2004 | Ziegler ....................... | 219/502 |

FOREIGN PATENT DOCUMENTS

| | | |
|---|---|---|
| DE | 19850248 | 8/1999 |
| FR | 2565019 | 11/1985 |
| JP | 11345892 | 12/1999 |

OTHER PUBLICATIONS

Zafiropoulos, N. Examiner, European Search Report Application No. EP 01 11 7060 dated Dec. 12, 2001.

* cited by examiner

Primary Examiner—Hwa Andrew Lee

(57) ABSTRACT

A measuring setup for measuring an optical device under test—DUT—includes an optical signal source for applying an optical signal to the DUT, and an optical receiver unit for measuring a response of the DUT on the applied signal. A measurement unit is coupled between the optical signal source and the optical receiver unit. The measurement unit comprises an optical circuit to provide optical signals from and/or to the DUT for measuring the DUT, whereby the optical circuit comprises optical components showing high susceptibility to mechanical noise. A shielding unit receives the optical circuit and provides at least partial shielding of the optical circuit and/or the DUT against mechanical noise.

13 Claims, 2 Drawing Sheets

TESTING ARRANGEMENT FOR OPTICAL DEVICES

BACKGROUND OF THE INVENTION

The present invention relates to the testing of optical devices.

Optical devices under test (DUT) are generally tested or measured by applying an optical signal and measuring a response on the applied signal. Such measurements, however, are normally subject to noise caused by optical, electrical, and mechanical sources.

In particular, interferometric measurements employing interferometers (such as e.g. Michelson or other interferometers) have been found to be highly susceptible to mechanical disturbances such as vibration or shock even caused by sound.

SUMMARY OF THE INVENTION

It is an object of the present invention to provide an improved measurement of optical component. The object is solved by the independent claims. Preferred embodiments are shown by the dependent claims.

According to the present invention, a measurement setup for measuring an optical device under test (DUT) is provided comprising a measurement unit with reduced susceptibility to mechanical noise such as e.g. sound or vibration. The measurement unit comprises an optical circuit with such optical components showing high susceptibility to mechanical noise. Such components might in particular comprise interferometers. The optical circuit is provided in a casing providing a shielding against mechanical noise. Preferably the casing is provided with relatively high weight, thus rendering the casing less susceptible to be excited by mechanical vibrations. The casing might therefore comprise mass plates or be entirely of a material massive relative to the optical circuit or its components.

While the optical circuit might be attached directly to at least one part of the casing, a vibration damping or shielding might be provided therebetween. This can be done by providing e.g. a rubber sheet between the optical circuit and the casing.

In a preferred embodiment, the measurement unit is further adapted to bear the DUT, so that the DUT will also benefit from damping of or shielding against mechanical noise as provided by the measurement unit. While the DUT can be placed directly onto the optical circuit housed within the casing, it is preferably provided outside the casing such as e.g. on top of the casing. This has the advantage that the casing need not be opened for inserting the DUT, which again can also be cause for measurement faults. A provision of the DUT outside the casing also leads to a higher reproducibility of measurements, since the measurement environment can be regarded as being substantially maintained. Preferably, a DUT holding unit is situated on top of the casing which might provide facilities for locating, arranging or coupling one or more DUTs. The DUT holding unit is optically coupled with the optical circuit e.g. by using fiber connections.

In another preferred embodiment, the measurement unit further comprises at least one vibration absorption device for absorbing vibrations of the casing. One or more of the vibration absorption devices might be arranged underneath the casing. Each vibration absorption device preferably comprises an arrangement of resilient members and plastic members, thus damping and absorbing mechanical vibrations.

In a further preferred embodiment, the optical circuit comprises only such (optical, electrical or mechanical) components substantially providing no own vibration at least during defined measuring times.

The measurement unit preferably comprises one or more optical inputs for receiving an optical signal for measuring the DUT, one or more optical contacts for coupling the DUT, and one or more optical outputs for providing optical signals in response to the applied optical input signals.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF THE INVENTION

Figure 1:
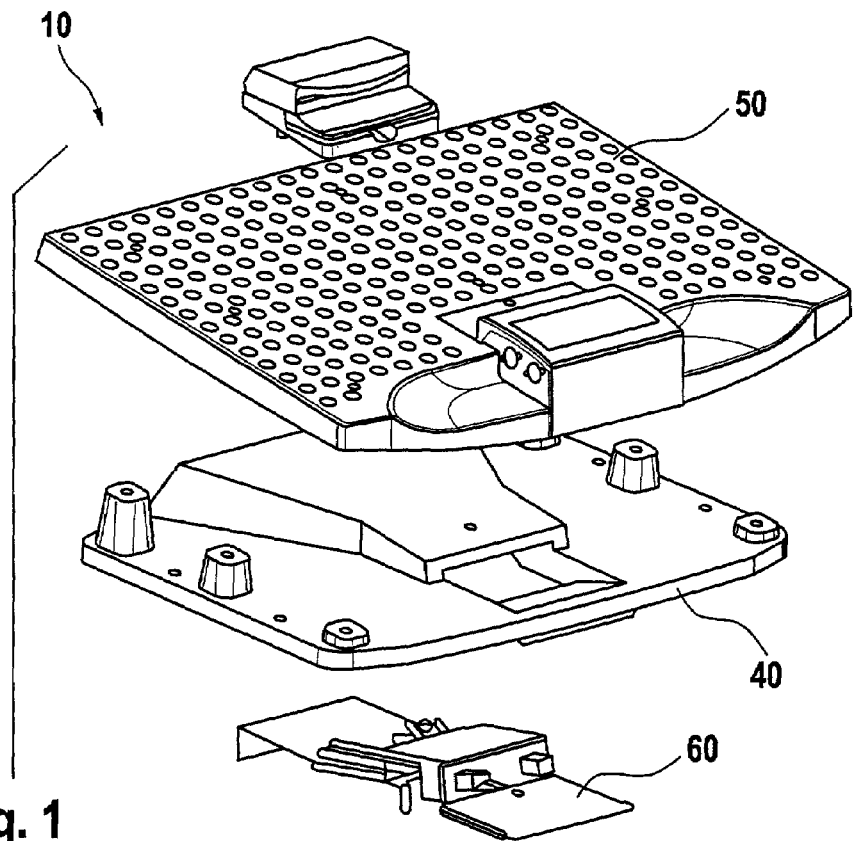
FIG. 1 shows in explosion view a preferred embodiment according to the present invention.
Figure 1:
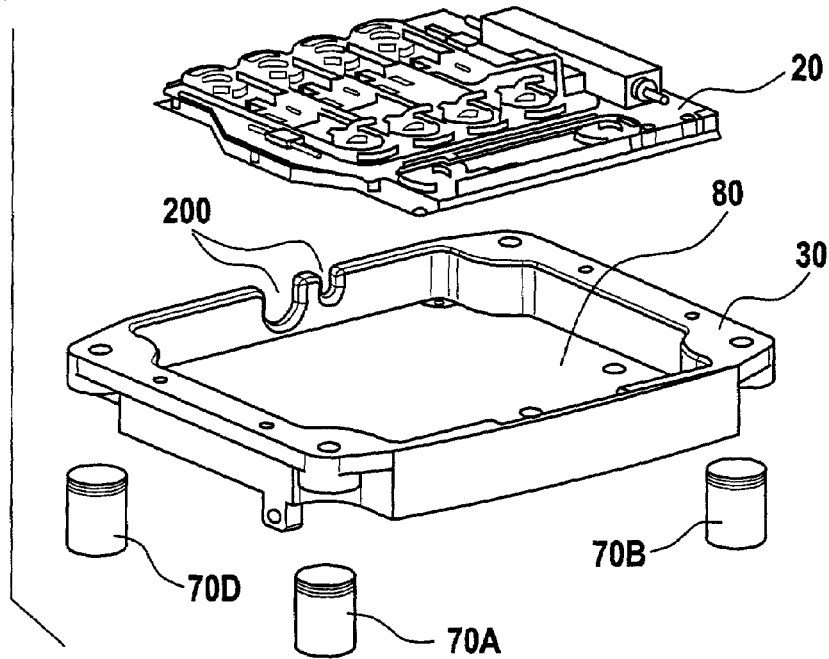

In FIG. 1, a measurement unit 10 comprises an optical circuit 20 being arranged between a lower casing part 30 and an upper casing part 40. The optical circuit 20 carries one or more optical devices and/or circuits and in particular such optical circuits or devices being susceptible to mechanical noise such as vibration.

The measurement unit 10 further comprises a DUT holding unit 50 adapted for receiving an optical DUT (not shown in the figures). An adapter 60 might be provided for coupling an optical connection from the circuit board 20 to the DUT holding unit 50.

The lower casing part 30 is situated on four vibration absorption devices 70A–70D, one on each side. From the perspective of FIG. 1, only three of the four vibration absorption devices can be seen. The upper and lower casing parts 30 and 40 are provided as mass parts with substantially higher weight relative to the circuit board 20. In a preferred embodiment, the upper and lower casing part 30 and 40 weigh approximately 20 kg, while the optical circuit board 20 roughly weighs less than 1 kg.

When assembled together, the optical circuit board 20 is mounted to the lower casing part 30, whereby preferably a rubber sheet 80 is inserted in-between. The adapter 60 is coupled to the optical circuit board 20 and the upper casing part 40 will be attached (e.g. using screws or similar attaching devices) to the lower casing part 30, so that the circuit board 20 is housed within a casing comprised of the upper and lower casing part 30 and 40.

The DUT holding unit 50 is attached on top of the upper casing part 40 adapted to couple one or more optical devices thereto and providing an optical connection to one or more optical circuits situated on the optical circuit board 20. The DUT holding unit 50 is preferably provided with adequate facilities allowing to easily arranging one or more DUTs as well known in the art.

The entire assembly comprised of upper and lower casing parts 30 and 40 including the circuit board 20 and the DUT holding unit 50 is placed onto the vibration absorption devices 70A–70D in order to absorb vibrations of the assembly.

Figure 2:
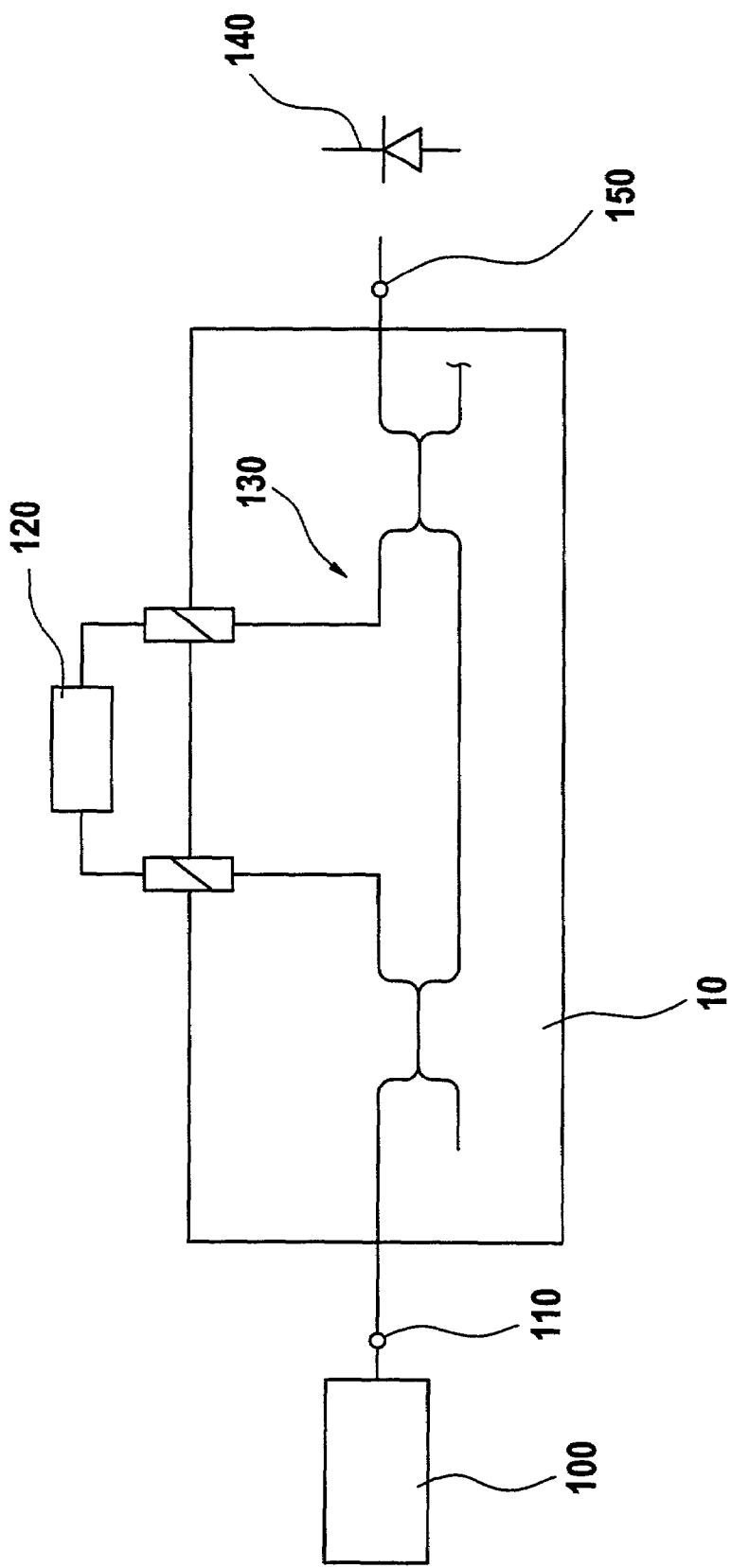
FIG. 2 shows an example of an optical measurement arrangement according to the present invention.

In FIG. 2 an optical source 100, such as a wavelength tunable laser source, couples an optical signal to an input 110 of the measurement unit 10. A DUT 120 is coupled into one part of an interferometer 130. Both paths of the interferometer 130 receive the optical input signal from the source 100. An optical detector 140 is coupled to the output of the interferometer 130 and detects the interference signal in response to the applied input signal.

While the measurement unit 10 comprises the optical circuit provided by the interferometer 130 and also bears the DUT 120 (as shown in FIG. 1), the optical source 100 as well as the optical receiving device 140 represent external devices with respect to the measurement unit 10. The measurement unit 10 is adapted to be coupled to such external devices by providing the input 110 and the output 150. As apparent from FIG. 1, the casing provided by the upper and lower casing parts 30 and 40 might provide throughputs 200 to couple such external devices of the optical circuit board 20.

What is claimed is:

1. A measurement unit for use in a measuring setup for measuring an optical device under test (DUT), comprising:
   a fiber connection for connecting to said DUT;
   an optical circuit for providing an optical signal from and/or to the DUT via said fiber connection;
   a shielding unit having an upper casing part and a lower casing part, for holding the optical circuit therein and for providing at least a partial shielding of the optical circuit against mechanical noise;
   a vibration absorption device for absorbing vibrations of the shielding unit; and
   a DUT holding device, situated on top of the shielding unit, for holding the DUT.

2. The measurement unit of claim 1, wherein the shielding unit has a relatively high weight, thus rendering the shielding unit less susceptible excitation by mechanical vibrations.

3. The measurement unit of claim 1, wherein the shielding unit weighs substantially more than the optical circuit.

4. The measurement unit of claim 1, wherein the shielding unit comprises a mass plate or is provided of a material massive relative to the optical circuit.

5. The measurement unit of claim 1, wherein the optical circuit is attached to a part of the shielding unit.

6. The measurement unit of claim 1, further comprising a vibration damping or shielding device between the optical circuit and the shielding unit.

7. The measurement unit of claim 1, wherein the optical circuit comprises an interferometer.

8. The measurement unit of claim 1, wherein the DUT holding device is coupled to the shielding unit so that the shielding unit provides at least a partial shielding of the DUT against mechanical noise.

9. The measurement unit of claim 1, wherein the DUT holding device is outside the shielding unit.

10. The measurement unit of claim 1, wherein the vibration absorption device comprises an arrangement of resilient and plastic members for damping and absorbing mechanical vibrations.

11. The measurement unit of claim 1, wherein the optical circuit comprises components that provide substantially no vibration during the measuring step.

12. The measurement unit of claim 6, wherein said vibration damping or shielding device is a rubber sheet.

13. A measuring setup for measuring an optical device under test (DUT), comprising:
   an optical signal source for applying an optical signal to the DUT;
   an optical receiver unit for measuring a response of the DUT to the applied signal; and
   a measurement unit coupled between the optical signal source and the optical receiver unit, said measurement device having:
      a fiber connection for connecting to said DUT;
      an optical circuit for providing an optical signal from and/or to the DUT via said fiber connection;
      a shielding unit having an upper casing part and a lower casing part, for holding the optical circuit therein and for providing at least a partial shielding of the optical circuit against mechanical noise;
      a vibration absorption device for absorbing vibrations of the shielding unit; and
      a DUT holding unit, situated on top of the shielding unit, for holding the DUT.

* * * * *